United States Patent [19]
Zurecki et al.

[11] Patent Number: 5,518,221
[45] Date of Patent: May 21, 1996

[54] METHOD AND APPARATUS FOR INERT GAS BLANKETING OF A REACTOR OR VESSEL USED TO PROCESS MATERIALS AT ELEVATED TEMPERATURES SUCH AS AN INDUCTION FURNACE USED TO REMELT METALS FOR CASTING

[75] Inventors: Zbigniew Zurecki, Macungie; John L. Green, Palmerton; Robert C. Best, Blandon; David J. Lach, Kempton, all of Pa.

[73] Assignee: Air Products and Chemicals, Inc., Allentown, Pa.

[21] Appl. No.: 346,647

[22] Filed: Nov. 30, 1994

[51] Int. Cl.⁶ .................................................. C21B 13/00
[52] U.S. Cl. .......................... 266/44; 266/217; 266/158; 222/603
[58] Field of Search .......................... 266/44, 207, 217, 266/158, 159; 222/603; 25/553, 555; 432/64, 10

[56] References Cited

U.S. PATENT DOCUMENTS

| | | | |
|---|---|---|---|
| 4,723,997 | 2/1988 | Lutgen | 75/96 |
| 4,823,680 | 4/1989 | Nowotarski | 98/36 |
| 4,990,183 | 2/1991 | Anderson et al. | 75/555 |
| 5,195,888 | 3/1993 | Sharma et al. | 432/64 |
| 5,366,409 | 11/1994 | Riley | 432/64 |

*Primary Examiner*—Scott Kastler
*Attorney, Agent, or Firm*—James C. Simmons

[57] ABSTRACT

A method and apparatus for blanketing the surface of material, e.g. molten metal contained in an open top vessel, e.g. induction furnace, by establishing a swirling flow of an inert gas having a density greater than air at the top of the vessel. Inert gas exits the swirl flow through an opening in a flow controlling apparatus having an exit opening with a diameter that is smaller than the base diameter of the swirl adjacent the open top vessel.

18 Claims, 8 Drawing Sheets

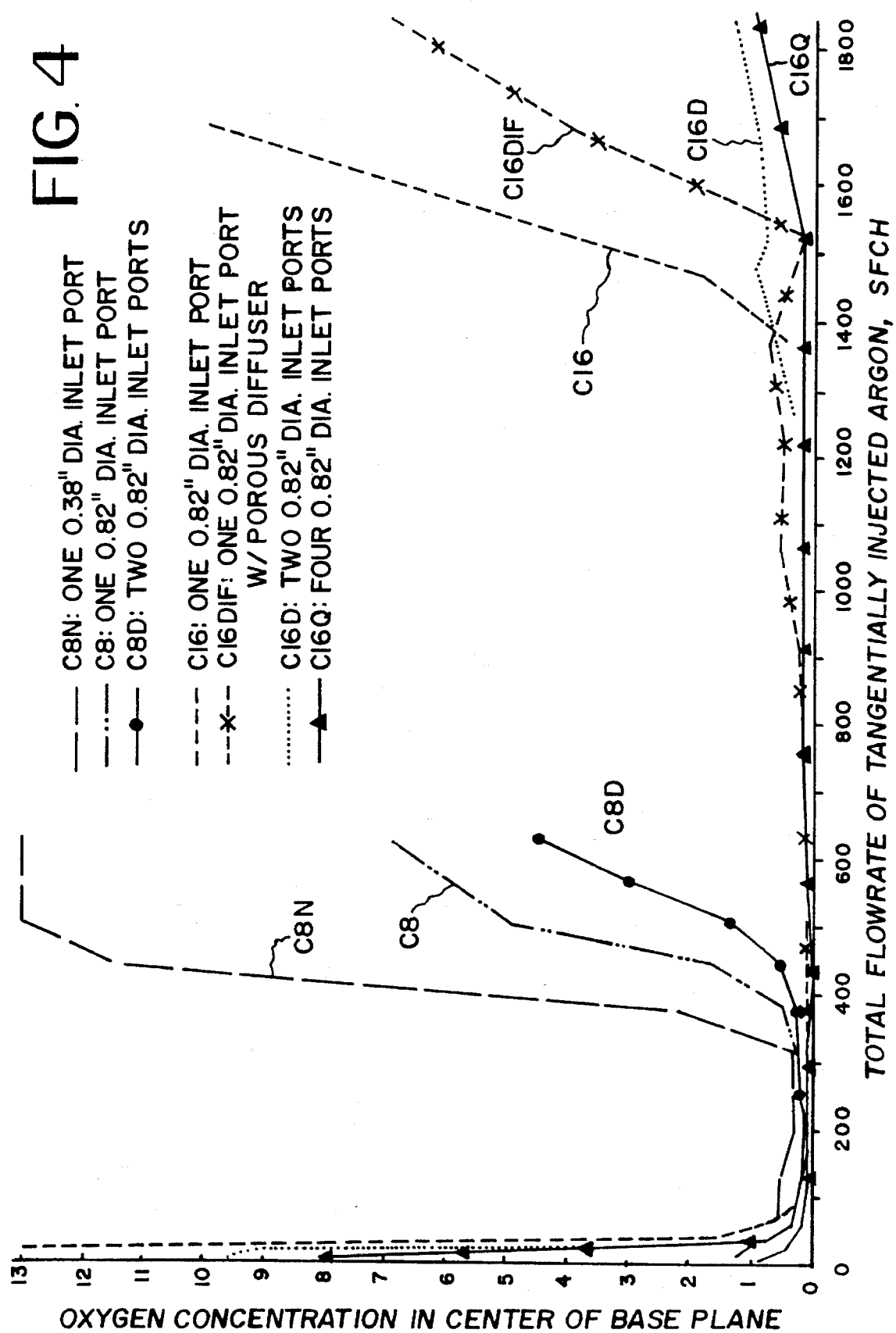

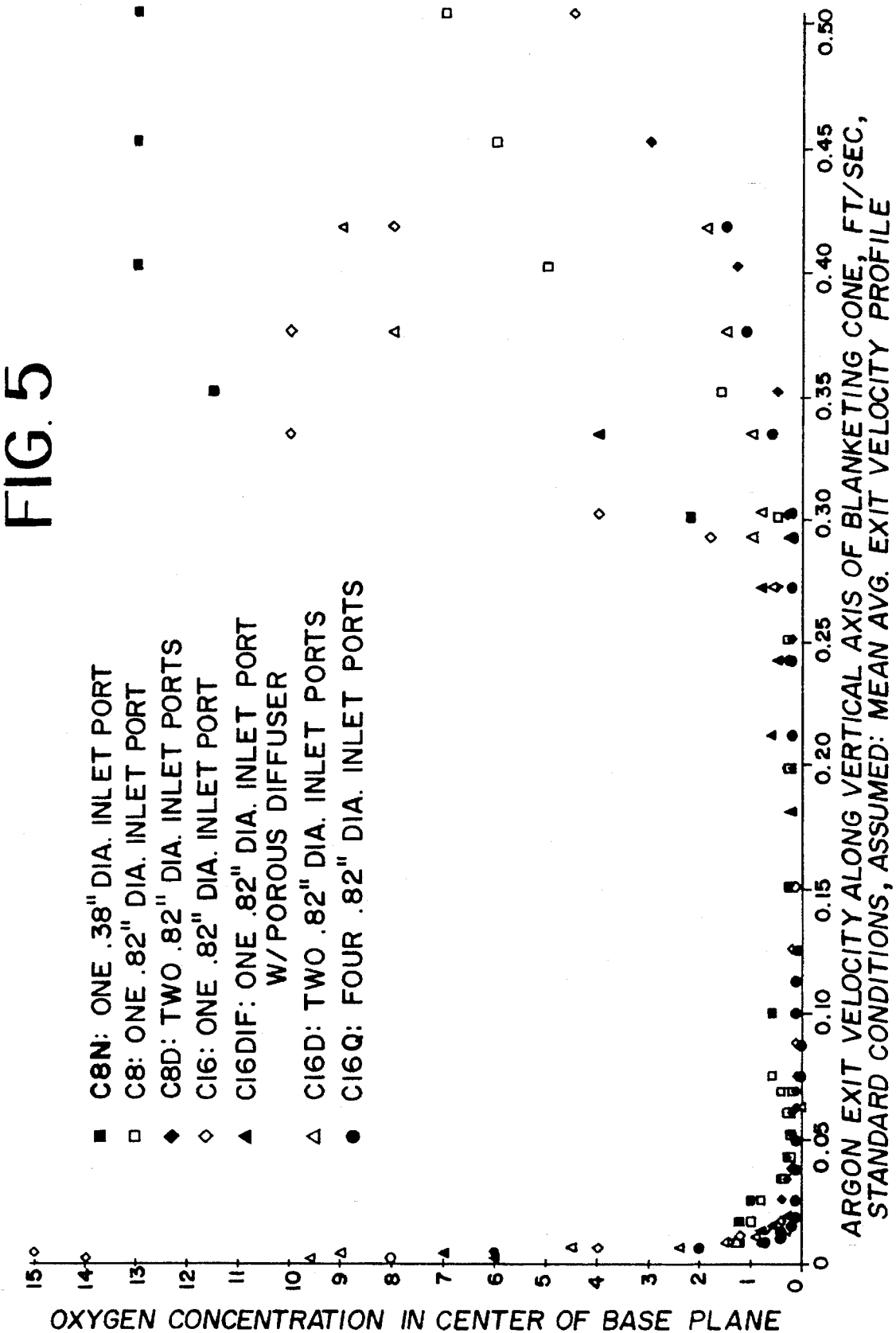

METHOD AND APPARATUS FOR INERT GAS BLANKETING OF A REACTOR OR VESSEL USED TO PROCESS MATERIALS AT ELEVATED TEMPERATURES SUCH AS AN INDUCTION FURNACE USED TO REMELT METALS FOR CASTING

FIELD OF THE INVENTION

The present invention pertains to inert gas blanketing of materials at elevated temperatures in open top vessels.

BACKGROUND OF THE INVENTION

Open top vessels such as induction furnaces used to remelt metals are operated so that the surface of metal during melting and the surface of the molten bath are exposed to ambient atmosphere. Air in the atmosphere tends to oxidize the melt causing loss of alloying additions, formation of slag causing difficulty in metal processing, shortening refractory life, promoting nonmetallic inclusions in the final casting, pickup of unwanted gases in the metals, porosity, and poor metal recovery. One solution to the problem is to enclose the induction furnace in a vacuum or atmosphere chamber for melting and/or processing of the metals. However, completely enclosed systems are very expensive and limit physical and visual access to the metals being melted.

Liquid fluxing salts, synthetic slag, charcoal covers and similar methods and compounds have historically been used in the high volume, cost-sensitive field of metal reprocessing for minimizing metal oxidation, gas pickup and loss of alloying additions. None of these techniques obstruct the required access to the metal surface but do necessitate additional handling and processing and cause disposal problems. All too frequently these top covers reduce furnace life or ladle refractory life, increase frequency of shutdowns for relining or patching of refractories and can produce nonmetallic inclusions that have to be separated from the metal bath prior to pouring of the metal into a cast shape.

In searching for solutions to the above described problems, metallurgical industries turned to inert gas atmosphere blanketing for solutions to the problems. One group of gas blanketing systems is based on the principle of a gravitational dispersion of cryogenically-liquified inert gas over the surface of a hot metal to be blanketed. An example of cryogenic blanketing systems is disclosed and claimed in U.S. Pat. No. 4,990,183. While some cryogenic blanketing methods are found to be quite effective, their use is limited to those metallurgical facilities and vessels which can be supplied by well insulated cryogenic pipelines or equipped with cryogenic storage tanks in close proximity to the point of use of the liquid cryogen. This is not always practical, thus many cryogenic blanketing systems have been plagued by poor efficiency due to the premature boil-off of the cryogenic liquid and oversimplified design of dispersing nozzles that wasted the boiled-off gas phase. Moreover, existing cryogenic dispensers usually fail to uniformly disperse the cryogenic liquid over the blanketed surface leading to a transient accumulation or entrapment of the liquid in pockets under the slag or dross which may sometimes result in explosions in a subsequent rapid boil-off.

Another group of gas blanketing systems is based on the principle of shrouding molten metal surfaces with a curtain or barrier of substantially inert gases at room temperature discharged from multiple nozzles, diffusing plates or tubes where the gas is discharged parallel to the blanketed surface. Such techniques are shown in U.S. Pat. Nos. 4,823,680 and 5,195,888. Because of the required geometric configuration the horizontal barrier systems shown in the prior art are placed at the top plate of a furnace housing thus causing the furnace operator to eliminate normal fume venting devices. Since the diffusing elements are nozzles that expel inert gas across a large portion of the top of the furnace and are spaced a distance from the melt surface, large volumes of gases must be consumed to significantly reduce oxygen (and/or nitrogen) concentrations inside of the furnace crucible. If the diffusing elements were moved closer to the rim of the furnace crucible, they would suffer clogging from metal splash because of the small diameter of the gas orifices, impact from heat from the molten metal, or the induction field in an induction furnace. They could also be mechanically damaged during charging of solids into the crucible. Thus there is a need for a blanketing method that will avoid the problems with the prior art methods and devices.

SUMMARY OF THE INVENTION

According to the present invention creating a swirling flow, in the form of a stable vortex, of inert gas adjacent the open top of a reactor, ladle or furnace results in blanketing of the metal surface and minimization of infiltration of the ambient atmosphere.

A device according to the present invention can be a cylindrical shaped body made of a heat resisting material (e.g. refractory) which is placed over the opening of the vessel, i.e., the top of an induction furnace. The swirl pattern of gases is achieved by introducing the inert gas tangentially into the central aperture of the cylinder at a point proximate the open end of the vessel or furnace. The central passage of the body has a larger opening at the end adjacent the open top of the vessel or furnace then at the second or discharge end where the swirling gases are allowed to rise and be dispersed into the atmosphere or into a collection device. The cylindrical body can have an internal shape in the form of a truncated cone or can be in the shape of a stepped cylinder formed by having a ring of a constant diameter cylindrical internal passage over which is placed a ring having a smaller diameter passage.

BRIEF DESCRIPTION OF THE DRAWING

FIG. 3e is a diagrammatic representation of formation of hot whirl above a molten metal bath for the device of FIG. 2a.

FIG. 3f is a diagrammatic representation of dust spinning and collection at high flow rates of injected gas with the device of FIG. 2a.

FIG. 4 is a plot of oxygen concentration in volume percent at the center of the base plane against total flow rate of tangentially injected argon for devices according to the present invention.

FIG. 5 is a plot of oxygen concentration in volume percent at the center of the base plane against argon exit velocity along the vertical axis of the blanketing cone for devices according to the present invention.

DETAILED DESCRIPTION OF THE INVENTION

The present invention pertains to a method and apparatus for inerting the interior space of a vessel containing hot liquids or solids. In particular, the invention is applicable to inert gas covering interior spaces of induction furnaces, crucible furnaces or ladles during charging, melting, alloying, treating, superheating, and pouring or tapping of metals and metal alloys. The present invention employs a swirl of inert gas to blanket or cover the surface of the metal from the time of charging of the furnace until the furnace is poured or tapped or inerting of the molten metal contained in a furnace or ladle or other vessel. The gas swirl is confined by a unique apparatus mounted on top of the furnace or vessel containing the material to be protected. Any inert gas that is heavier than air can be used to practice the invention. In addition to Argon and Nitrogen, depending upon the material being blanketed, gases such as carbon dioxide and hydrocarbons can be used as long as the gas has a density equal to or greater than 1.38 times that of air.

Figure 1:
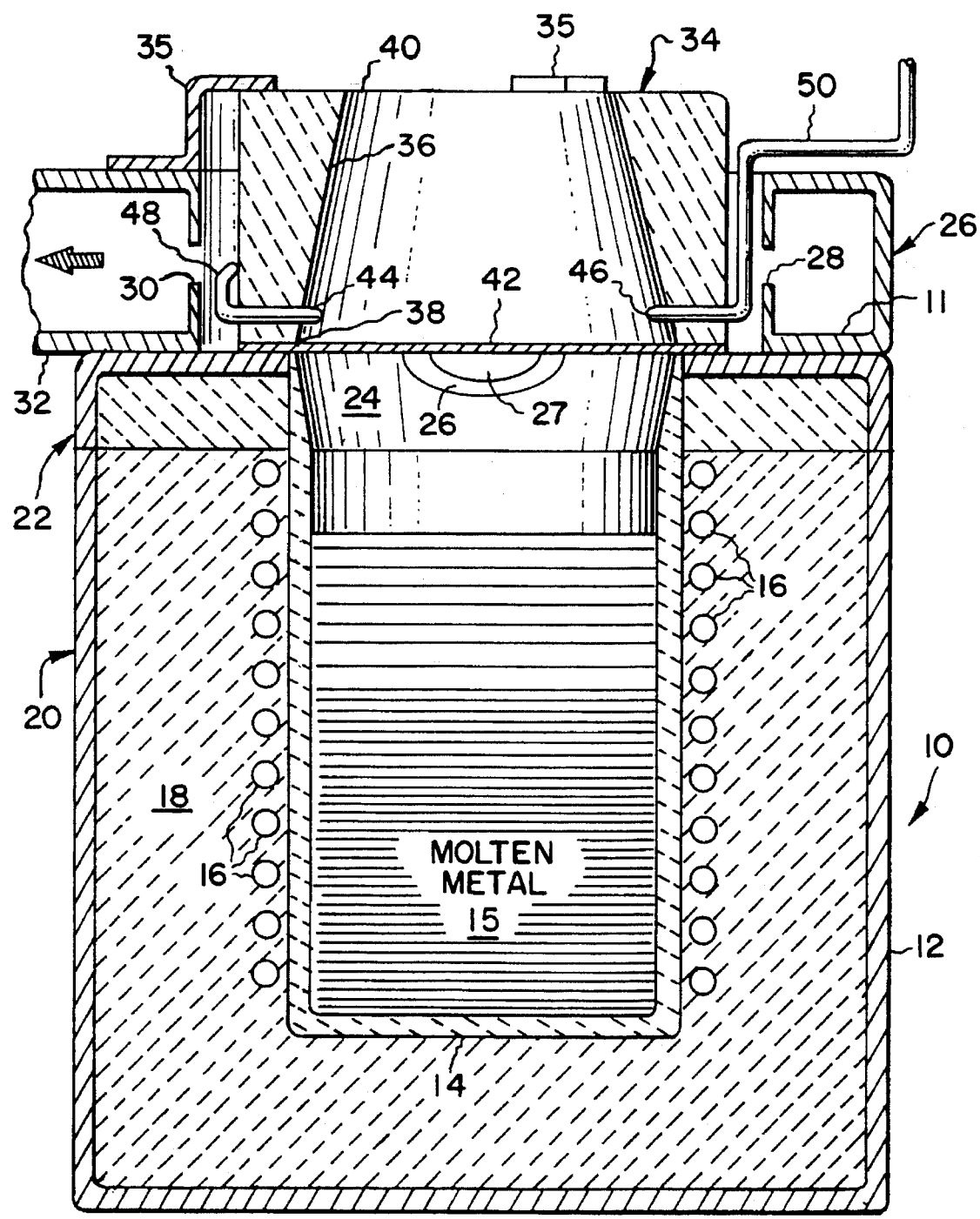
FIG. 1 is a schematic representation of an induction furnace which has been equipped with a device according to the present invention.

Referring to FIG. 1, a conventional induction furnace 10 consists of a outer metal jacket 12, a crucible 14, induction heating coils 16, the coils 16 and crucible 14 supported by refractory material 18, as is well known in the art. The furnace 10 can be made in a single unit or can comprise a bottom portion 20 and a top portion 22 in order to accommodate providing an entry portion 24 containing a furnace lip 26 and furnace spout 27 to facilitate charging and tapping or pouring the furnace 10. Conventional induction furnaces can be pivoted by a mechanism (not shown) to facilitate pouring as is well known in the art. Furnace 10 can be fitted with a vent system 26 which has a series of slots or openings 28 and 30 spaced around the circumference so that fumes emanating from the crucible 14 can be withdrawn via the conduit portion 32 to an exhaust system or recovery system (not shown). Other types of induction furnaces may not have a top vent system relying only on overhead hoods, fans or the like. Disposed on top of the furnace 10 is a device 34 according to the invention which may be referred to as a swirl cone. Swirl cone 34 is generally cylindrical in shape and has a major internal passage 36 in the shape of a truncated cone. The outside shape of the swirl cone can be made in any convenient shape, however, the internal passage 36 must have circular symmetry. Internal passage 36 has the larger diameter of the cone 38 placed adjacent to the top of the furnace 10 and the smaller diameter of the cone 40 acts as a passage for swirling gas to escape as hereafter will be more fully explained. Swirl cone 34 is fitted to the furnace 10 by means of a sealing member 42. If the top surface of the furnace is sufficiently flat and smooth, a sealing member may not be required. Sealing member 42 can be a soft refractory material in the shape of a large washer or the like to prevent gas from escaping between the top of the furnace 10 and bottom 38 of swirl cone 34. A series of brackets 35 can be used to position swirl cone 34 so that it does not move during furnace operation and tilting. Swirl cone 34 includes two tangential passages 44 and 46, which are in turn connected to conduits 48 and 50. Passages 44 and 46 are placed near the bottom of swirl cone 34 and provide a tangential inlet for gas admitted through conduits 48 and 50 to create a swirling gas inside of the cone 34 to blanket the surface of molten metal 15 to prevent contact of the surface of the molten metal 15 with ambient atmosphere. The gas introduced in conduits 48 and 50 can be any of the well known inert gases used in metallurgical processing such as argon.

Figure 2A:
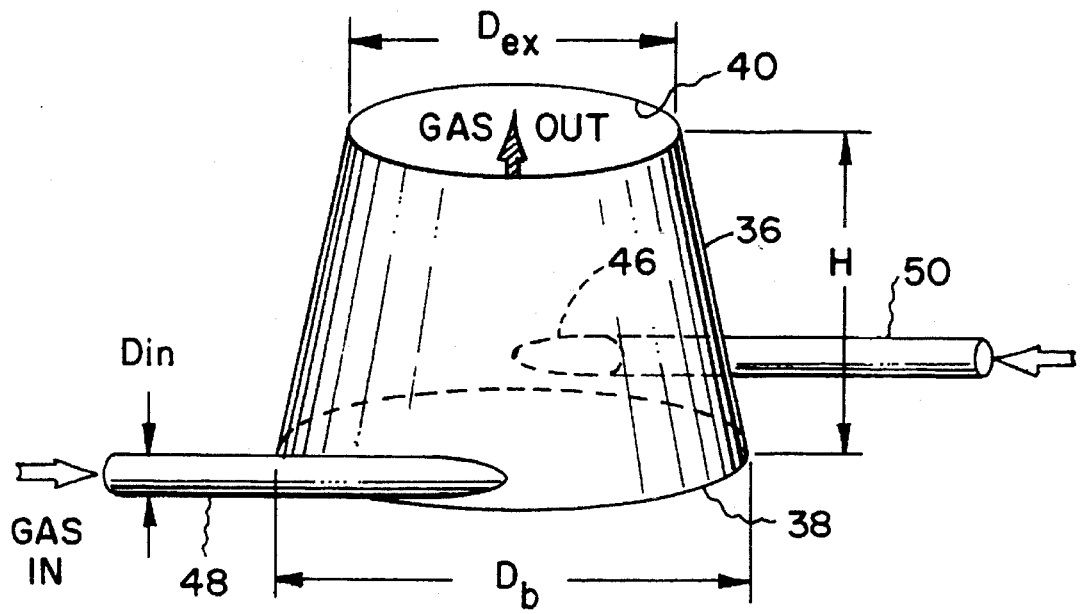
FIG. 2a is a schematic representation of one form of internal passage for the device of the invention.

FIG. 2a shows the internal passage 36 of cone 34 in schematic form with the gas conduits 48 and 50 and gas inlet 46 according to the invention. The large hollow arrows indicate inert gas entry into the cone and the large shaded arrow indicates the gases exiting passage 36.

Figure 2B:
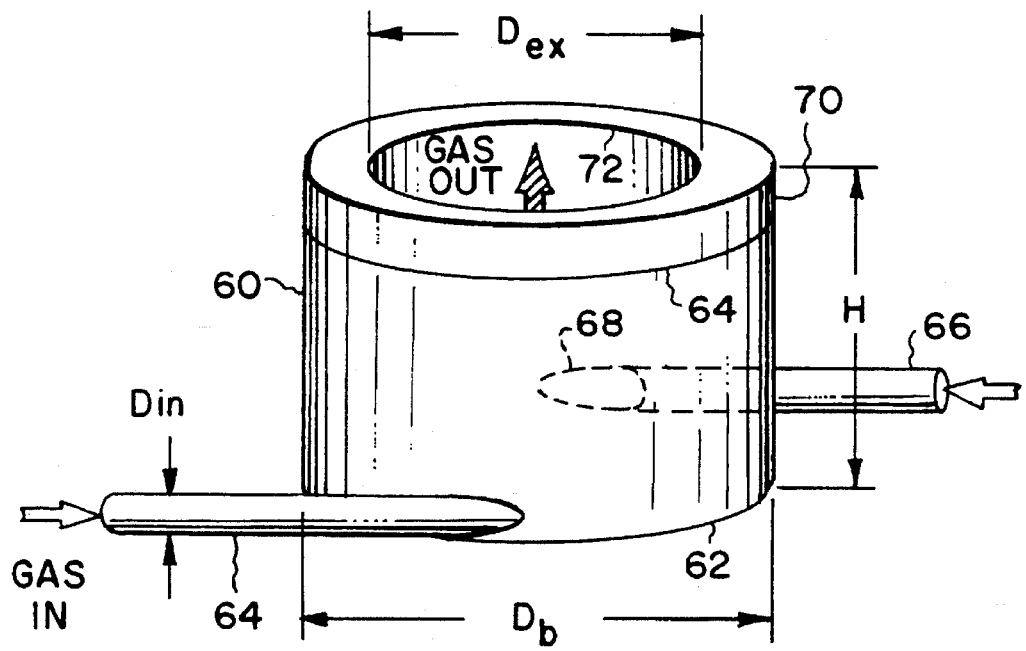
FIG. 2b is a schematic representation of an alternate form of the internal passage of the device of the present invention.

Shown in FIG. 2b is an alternate embodiment of the invention wherein the internal passage of the cone is a cylinder 60 extending from a first or furnace end 62 to a top end 64. The diameter of the cylindrical passage is uniform and shown as $D_b$ in FIG. 2b. Gases are introduced to the interior of the passage 60 via conduit 64 and 66. The outlet or gas discharge passage for conduit 66 is shown as 68 and is placed proximate the first end 62 of the cylindrical passage. A top or ring cover 70 is placed on the second end 64 of the passage 60 so that a narrower opening shown as $D_{ex}$ where the swirling gas exists the swirl cone is a necessary part of having a cylindrical passage in the swirl cone as will hereinafter will be more fully explained. In this embodiment cylinder 60 can be fabricated as an extension to the furnace crucible which extends beyond the top of the furnace. Tangential outlets and passages would be formed in the portion of the crucible projecting beyond the top of the furnace. Gas movement in the cone is shown by means of the same arrows used in FIG. 2a.

The swirl cone 34 (FIG. 1) is fabricated from a material that can withstand the radiative and convective heat from the processing vessel, e.g. induction furnace 10. Thus, where the device is used to swirl blanket a molten metal such as steel in the induction furnace 10, a preferred material of construction is a refractory ceramic. On the other hand, if lower melting point metals such as tin or lead alloys are being processed, and no interference with the electromagnetic field is expected, the swirl cone 34 can be fabricated from steel or even aluminum. The swirl cone 34 can be built up from layers of material or can be fabricated as a single piece, e.g. a cast ceramic. In the case of the cylinder and ring cover shown in FIG. 2b, the structure can be a single cast ceramic or for ease in fabrication and installation made in two pieces. The swirl cone 34 can be sized to fit within the fume evacuation system 26 of induction furnace such as shown in FIG. 1. It is important that the swirl cone 34 make an efficient seal with the top 11 of furnace 10.

The method of the present invention is based upon the size and positioning of the passage 36 of the swirl cone 34 has hereinafter discussed in relation to FIGS. 2a and 2b. Referring to FIGS. 2a and 2b, the notation $D_b$ refers to the internal diameter of the internal passage of the base of the cone or cylinder. $D_{ex}$ is the internal diameter of the opening at the top of the cone (frustum of the cone) or the internal diameter of the ring cover mounted on the top of the cylinder. $D_{in}$ refers to the internal diameter of tube-like injectors 48, 50, 64, and 66 mounted in the sidewall of the cone or cylinder for tangential injection of the inert gas, e.g. argon. The letter n stands for the number of tangential injectors which are mounted symmetrically in the sidewall of the cone or cylinder if n>1. Lastly, H refers to the height of the cone or cylinder measured from the base plane where the internal diameter is $D_b$ to the top exit plane where the internal diameter is $D_{ex}$. Thus, according to the invention, the following relationship is maintained:

$$\text{1/120 feet} \leq D_{in} > D_{ex} \leq D_b \leq 12 \text{ feet}$$

and $$0.25 D_{ex} < H < 5 D_{ex}$$

Thus, the method of invention in which the temperature of injected argon $T_{in}$ can vary between its freezing point $T_s$ (−186° C.) and the temperature of the ambient air atmosphere $T_a$ defines the relationship so that:

$$T_a > T_{in} > T_s$$

The total mass-flowrate of argon injection is such that the mean average exit velocity of argon escaping through the top opening of the cone or cylinder (40, 72), calculated for room temperature and 1 atmosphere pressure, ranges from 0.01 to 4.0 feet per second. The mean average exit velocity of argon, $V_{ex}$, is calculated by dividing the total injection flowrate expressed in Standard Cubic Feet/Hour (SCFH) units by 3600 sec/hr and by the surface area of the opening of the cone or cylinder, $D_{ex}$, expressed in feet-squared (ft$^2$) units as:

$$V_{ex}(\text{SCFH argon})/3600/(\pi D_{ex}^2/4),$$

so that $$0.01 \text{ feet/sec} < V_{ex} < 4.0 \text{ feet/sec}.$$

The method provides for equilibrating any changes in geometry or argon gas temperature to maintain the same swirl blanketing effectiveness, that is the same (low) oxygen concentration in the base plane of the cone or the cylinder with the co-axial ring cover. Thus, geometric and thermal changes in the swirl blanketing system can be balanced according to the following approximating relationships:

$$(T_{in}/T_{ex})[D'_b D'_{ex}/(n' D'_{in} 2)] =$$

$$(T''_{in}/T''_{ex})[D''_b D''_{ex}/(n'' D''_{in} 2)] = \text{Constant}$$

where: $T_{ex}$=argon temperature at the top exit plane which results from the contact of argon with the heated or molten metal charge (at $T_m$) in the induction or crucible furnace or ladle, $$T_m > T_{ex} > T_a > T_{in} > T_s,$$

$T_{in}$, $T'_{ex}$, $D'_b$, $D'_{ex}$, n', and $D'_{in}$ are thermal and geometrical parameters characterizing one swirl blanketing system operating at a given mean average velocity, $V_{ex}$, and $T''_{in}$, $T''_{ex}$, $D''_b$, $D''_{ex}$, n'', and $D''_{in}$ are thermal and geometrical parameters characterizing one another swirl blanketing system operating at the same average velocity $V_{ex}$.

According to the invention, the efficiency of swirl blanketing can be maximized, that is the simultaneous reduction of argon consumption and oxygen concentration at the base plane or an improvement of swirl blanketing stability in the presence of external air drafts, by minimizing swirl number, S, at any given argon exit velocity, $V_{ex}$. The range of swirl numbers is from 1 to 1000. The argon swirl number of the blanketing cone (frustum of cone) or the blanketing cylinder with the ring cover can be estimated for the exit plane from the following expression:

$$S = (2/3)(T_{in}/T_{ex})[D_b D_{ex}/(n D_{in}^2)] \text{ and } 1.0 < S < 1000$$

In accord with the present invention, gas or gas blends that are different from pure argon but offer chemical compatibility with the material being processed in the vessel or furnace can be used for swirl blanketing if the ratio of its density ($\rho_{gas}$) at $T_{in}$ and atmospheric pressure $P_a$ to the density of ambient atmosphere ($\rho_{air}$) at $T_a$ is more than unity and preferably at least 1.38 according to the following relationship:

$$\rho_{gas}(T_{in}, P_a)/\rho_{air}(T_a, P_a) > 1.00$$

and preferably $$\rho_{gas}(T_{in}, P_a)/\rho_{air}(T_a, P_a) \geq 1.38$$

Figure 3A:
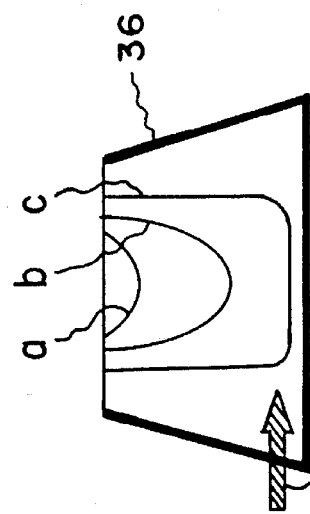
FIG. 3a is a schematic representation of air penetration profiles indicating degree of oxygen penetration as a function of inert gas flow for the embodiment of FIG. 2a of the present invention.
Figure 3B:
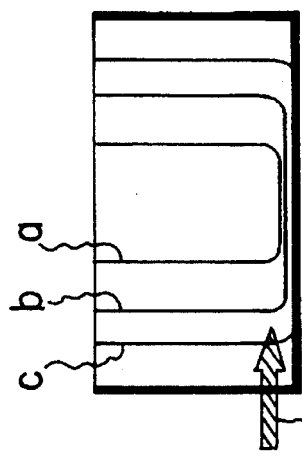
FIG. 3b is a diagrammatic representation of air penetration profiles for an open top cylinder.

FIGS. 3a through 3b are illustrative of a series of room temperature experiments relating to oxygen concentration measurements and smoke visualization. The tests were run with various flowrates of argon tangentially injected into the swirl cone. It was determined that surprisingly, the depth of air penetration and the concentration of oxygen at the base plane of the swirl cone were larger for the higher argon flowrates tested.

FIG. 3a shows the penetration profiles for the truncated cone central passage of the swirl cone of the present invention shown in FIG. 2a. Curve a shows air penetration at low flow rate, curve b shows air penetration at mid flow rate, and curve c shows air penetration at high flow rate for an inert gas introduced as shown by the arrow 80 in FIG. 3a. Air penetration is a measure of oxygen penetration in the head space protected by the method and apparatus of the present invention.

FIG. 3b shows the same air penetration profiles for an open top cylinder where the gas is introduced through a conduit 82. It is clear that the depth and diameter of the air penetrated volume are much larger than in the previous case. This results in the least effective swirl blanketing effect.

Figure 3C:
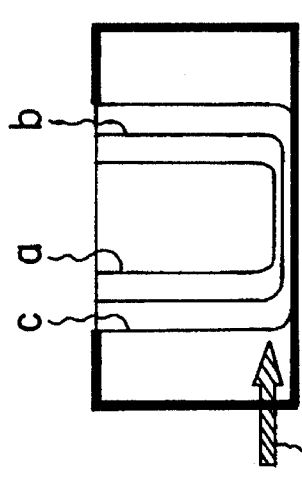
FIG. 3c is a diagrammatic representation of air penetration profiles for a device according to the embodiment of FIG. 2b of the invention.

FIG. 3c shows the same air penetration profiles for the embodiment of FIG. 2b which is the ring covered cylinder where the gas is introduced as shown by arrow 84. Thus, the effect of the ring is the limited penetration of air. The ring covered cylinder is not, however, as effective as the cone.

Figure 3D:
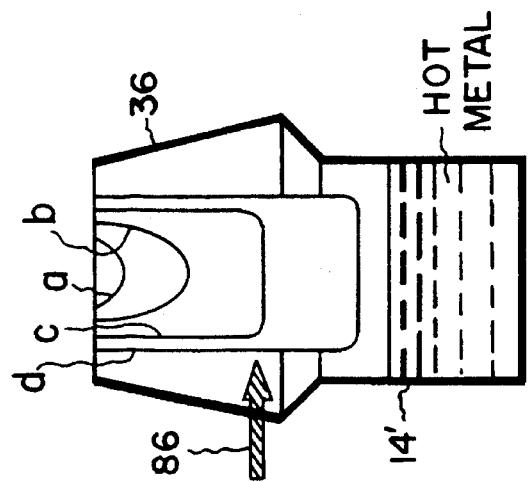
FIG. 3d is a diagrammatic representation of air penetration profiles for the system shown in FIG. 1.

FIG. 3d shows the air penetration profiles for an induction furnace containing hot metal in the crucible 14' with a swirl cone 34' where the gas is introduced as shown by arrow 86. Curve d represents the results with a flow even higher than that for curve c of the previous figures. Because of the larger distance from the plane $D_{ex}$ to the melt surface, the high flowrate represented by curve d is still acceptable from the standpoint of swirl blanketing since the surface of the melt hasn't been in contact with the air penetrated volume in the furnace headspace.

Figure 3E:
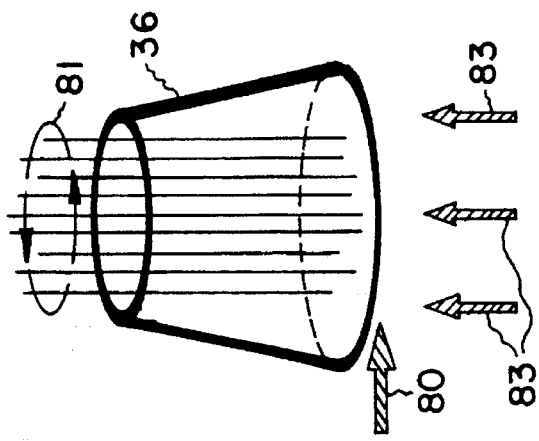

FIG. 3e shows the observed effect of hot gas swirl 81 forming above the melt surface, inside or above the top of the cone at higher flow rates of argon tangentially injected as shown by arrow 80. Arrows 83 indicate the path of heat from the hot metal. The simultaneous swirling of the inert gas and thermal expansion of the inert gas in the cone appears to explain why the inerting or blanketing of a hot furnace was unexpectedly found to be even easier and less argon-intensive than the inerting or blanketing at room temperature.

Figure 3F:
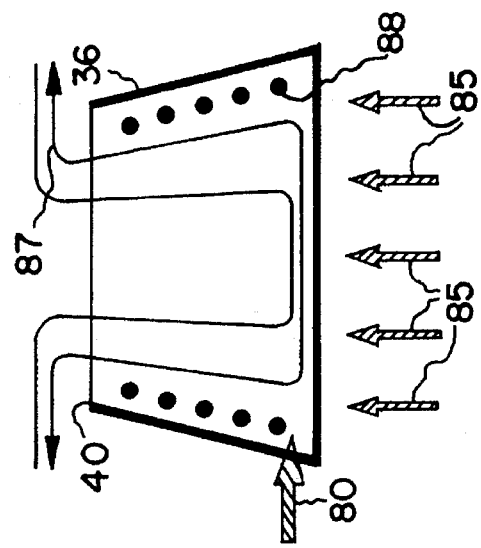

FIG. 3f shows the observed behavior of common fumes (arrows 85) evolving from the furnace during swirl blanketing with argon injected as shown by arrow 80 using higher flow rates. Coarser fume particles 88 were spun away and trapped inside the cone 36 which minimized overall emissions. Finer fume particles (arrows 87) were carried out by the gas to the exit 40 of the cone 36 and spun horizontally to be captured by the venting duct work surrounding the cone 36. Although this cyclone-like separation of fume particles from the furnace exhaust requires higher argon flowrates than the minimum necessary for furnace inerting, it can still be performed within the flowrate ranges for effectively inerting the metal bath inside the furnace.

The following description relates to a series of experiments that were carried out to demonstrate the effectiveness of the present invention.

EXAMPLE 1

Seven swirl blanketing cones were tested in atmospheric air at room temperature using argon gas injected at standard conditions. Oxygen concentration, normally 20.9 vol %, was measured at the center of the base plane of each cone as a function of total flowrate of argon injected. Table 1 lists characteristic dimensions of each cone. For cones which used two or more tangential injectors, the argon flowrate was evenly distributed among each injector. Results of the tests are plotted in FIG. 4.

TABLE 1

| Cone Symbol | $D_b$ | $D_{ex}$ | H | n | $D_{in}$ | Remarks |
|---|---|---|---|---|---|---|
| C8N | 12" | 8" | 8" | 1 | 0.38" | Injection port |
| C8 | 12" | 8" | 8" | 1 | 0.82" | with narrow |
| C8D | 12" | 8" | 8" | 2 | 0.82" | nozzle |
| C16 | 24" | 16" | 16" | 1 | 0.82" | |
| C16Dif. | 24" | 16" | 16" | 1 | 0.82" | Injection port |
| C16D | 24" | 16" | 16" | 2 | 0.82" | with porous |
| C16Q | 24" | 16" | 16" | 4 | 0.82" | diffuser |

It was observed that each cone has a specific range of optimum argon flowrates within which the oxygen concentration is nearly 0.0 vol %. Argon flowrates below or above this range result in a steep increase of oxygen concentration inside each cone. The width of the optimum range varies with the size of cones. The width is much larger for the C16-type cones than for the C8-type cones. Also, the width of the optimum range varies between each cone within the smaller and larger cone group. Among the C8-type cones tested, C8D offers the best stability of blanketing effect while CSN produces the least stable blanketing effect. Among the C16-type cones, C16Q inerts the base plane over a much broader argon flowrate range than C16 which means that C16Q is better fitted for use as an industrial blanketing system than is C16.

Results of the foregoing experiments were replotted in FIG. 5 using as an argument vertical exit velocity of injected argon rather than total argon flowrate which was an argument in FIG. 4. The vertical exit velocity is calculated as a mean average axial velocity of argon by dividing the total flowrate by the surface area of the opening. Unexpectedly, the data points plotted in FIG. 5 show that the optimum argon velocity range is no longer a function of cone size but depends on the number of injectors and the type of injection ports. Moreover, FIG. 5 shows that the optimum argon velocity range which assures the most stable blanketing effect extends from approximately 0.01 feet per second to 0.40 feet per second for devices tested.

Evaluation of gas swirl number, S was conducted to explain the impact of the number of injectors and the type of injection ports on blanketing in the base plane of the cones. Blanketing gas swirl, or the ratio of axial flux of angular momentum to axial flux of linear momentum and exit radius is calculated from the expressions given by A. Ogawa in Vortex Flow, CRC Press 1993. Swirl number, S for the exit plane, was first calculated under isothermal conditions (room temperature) using geometric parameters only. The isothermal swirl number is then multiplied by the ratio of inlet and exit temperatures $T_{in}/T_{ex}$ as given by Gupta et al. in Swirl Flows, Abacus Press 1984. In calculating swirl number it was assumed there was frictionless flow of an incompressible gas with the mean average distribution of axial velocity, and gas density is not a function of tangential velocity or radius. For the cones tested in Example 1, where $D_{ex}=2D_b/3$ and $T_{in}=T_{ex}$, the swirl number listed in Table 2 is calculated as:

TABLE 2

| Cone Symbol | n | $D_{in}$ | Swirl Number, S |
|---|---|---|---|
| C8N | 1 | 0.38" | 443.2 |
| C8 | 1 | 0.82" | 95.2 |
| C8D | 2 | 0.82" | 47.6 |
| C16 | 1 | 0.82" | 380.8 |
| C16Dif. | 1 | 0.82" | 380.8 |
| C16D | 2 | 0.82" | 190.4 |
| C16Q | 4 | 0.82" | 95.16 |

$S = (2/3)(T_{in}/T_{ex})[D_b D_{ex}/(n D_{in}^2)] = D_{ex}^2/(n D_{in}^2)$

The highest values of swirl number occurring for the cones C8N and C16 correlate to the poorest blanketing stability for these cones. The lowest values of swirl number occurring for the cones C8D or C16Q correlate to the best blanketing stability observed for these cones. Thus, lower swirl number systems are preferred in blanketing within the required 0.01 ft/sec–0.40 ft/sec optimum vertical velocity range.

EXAMPLE 2

Figure 6:
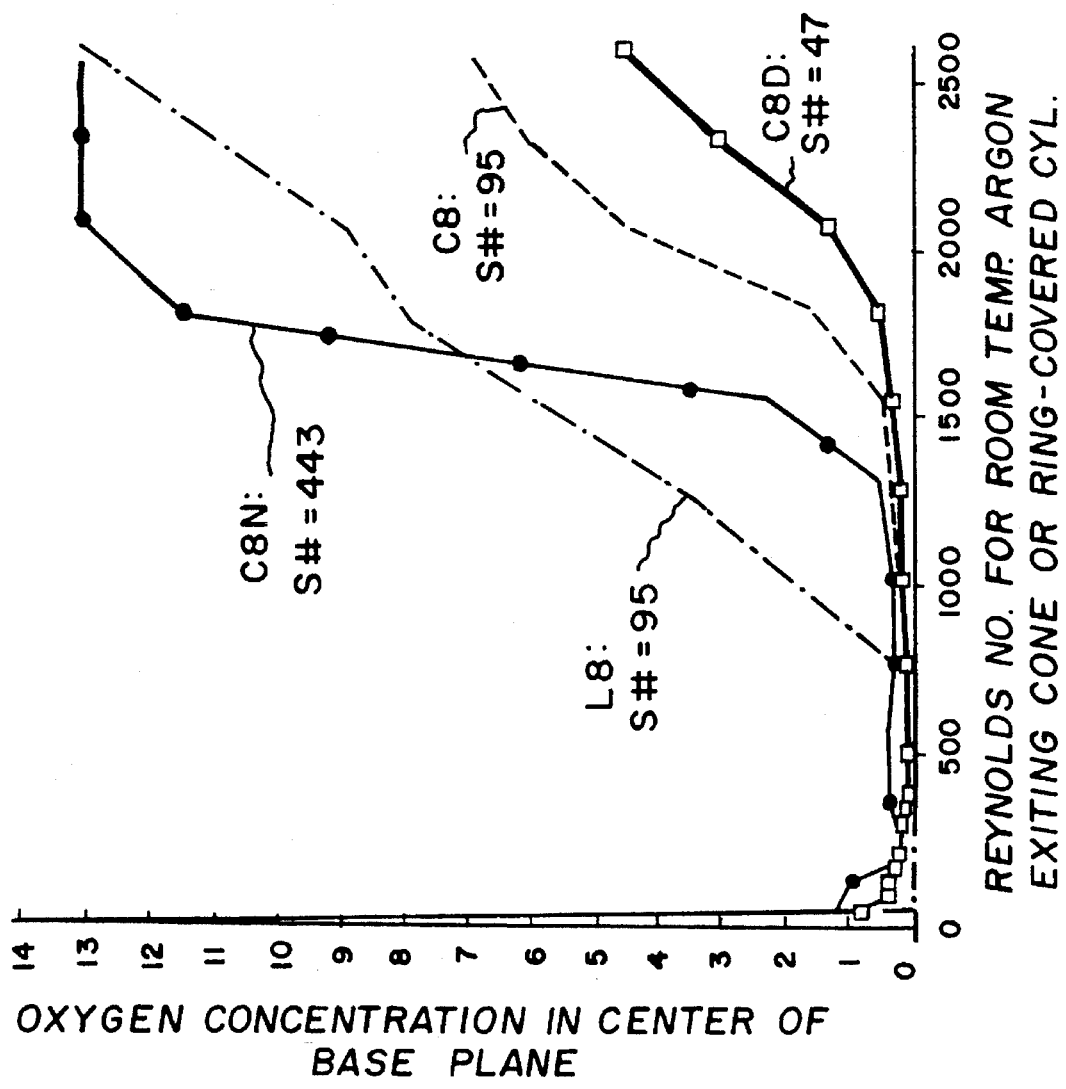
FIG. 6 is a comparison plot of oxygen concentration in the center of the base plane against Reynolds number for room temperature argon.

A ring-covered swirl blanketing cylinder (L8) was tested in air at room temperature using argon gas injected at standard conditions. The cylinder was equipped with one 0.82" dia. injector. The cylinder dimensions were as follows: $D_b=12"$, $H=8$ and $D_{ex}=8"$ (ring ID). Oxygen concentration, normally 20.9 vol %, was measured at the center of the base plane of the cylinder as a function of total flowrate of argon injected. Test data points and cylinder swirl number were plotted in FIG. 6 together with the data points obtained for the C8-type cones from Example 1 and their respective swirl numbers. Reynolds number (Re) of the vertical argon stream crossing the exit plane was used as an argument in the plot. The Re number was calculated from the following expression:

$$Re = V_{ex} D_{ex} / \nu$$

where: $\nu$-kinematic viscosity of argon at room temperature

Results of the comparison between the cylinder L8 and the C8-type cones show that the optimum argon flowrate range is narrower for the cylinder than for the cones but the swirl blanketing behavior is very similar. It is believed that observed disparity may result from an additional turbulence and an induced vortex flow pattern generated during the passage of the gas across the sharp edge of the ring covering the cylinder. Tapered ring covers offering more gradual passage of the gas through the top opening would be preferred for the swirl-blanketing cylinder systems.

EXAMPLE 3

Figure 7:
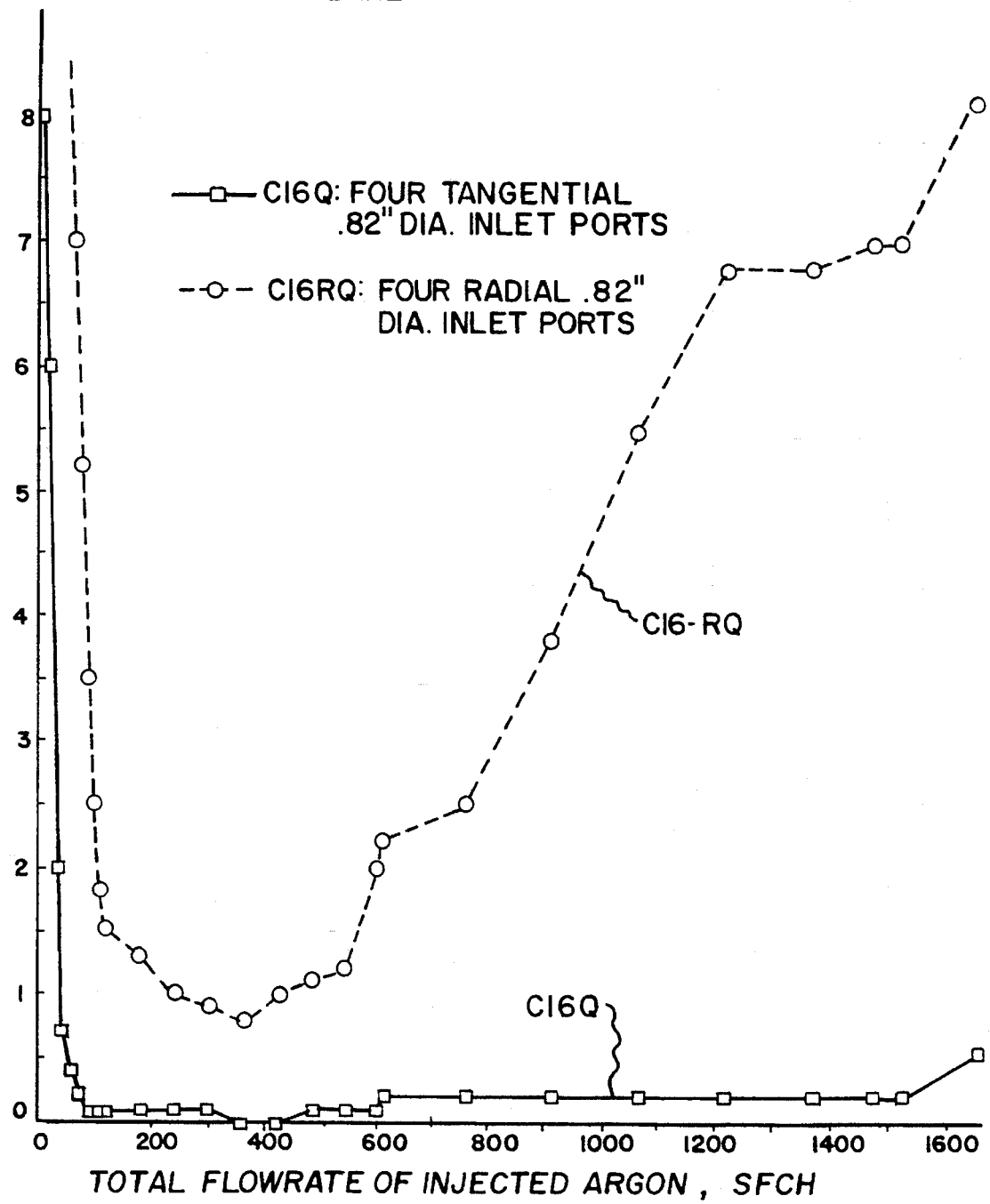
FIG. 7 is a plot of oxygen concentration in volume percent at the base plane against argon exit velocity along the vertical axis for one device according to the present invention and another device jetting argon radially rather than tangentially.

A non-swirling blanketing cone, C16-RQ, was fabricated by resetting the four tangential injection tubes of the cone C16Q in such a way that the gas was injected into the cone radially toward the main axis of the cone. Thus, the four 0.82" dia. injection tubes were symmetrically distributed in the horizontal base plane of the cone creating two pairs of opposing gas jets that stagnated at the vertical axis of the cone before forcing the gas out through the top opening ($D_{ex}$=16"). It should be emphasized that the change of the blanketing mode from swirling as in C16Q to radial as C16-RQ did not change Reynolds numbers of the injectors and the cone exit. The radial blanketing cone C16-RQ was tested in air at room temperature using argon gas injected at standard conditions. Oxygen concentration, normally 20.9 vol %, was measured at the center of the base plane of the cylinder as a function of total flowrate of argon evenly injected via four injection tubes. Test data points were plotted in FIG. 7 together with the data points obtained for the swirl blanketing C16Q cone from Example 1. Comparison of the C16-RQ and C16Q test data shows the swirl blanketing mode to be significantly more effective. This result is the best experimental demonstration of the unexpected gas flow rate effects of the method and apparatus of the present invention.

EXAMPLE 4

A swirl blanketing cone C8D specified in Table 1 was installed in a specialty steel foundry at the top of an induction furnace as shown in FIG. 1. Foundry ventilation system included furnace duct work as well as few overhead electric fans. Argon gas at room temperature was admitted to the cone at the initial flowrate of 464 SCFH. The oxygen concentration measured inside the furnace crucible near the top of the solid metal charge was 2.0 vol %. In the next step of the test, the argon flowrate was reduced from 464 SCFH to the more optimal value of 232 SCFH. In response, the oxygen concentration dropped to less than 0.5 vol %. Later in the heat, as the steel charge melted down and the bath became superheated, the oxygen concentration above the melt surface dropped again to between 0.0 and 0.4 vol %.

In the next phase of foundry testing, the argon gas admitted to the cone was drawn directly from a cryogenic argon tank which eliminated the need for vaporizer and reduced injection temperature ($T_{in}$) from about 80 degrees F. to about −200 degrees F. The oxygen concentration measured above the melt surface at the same flowrate of 232 SCFH of argon varied within the 0.0–0.2 vol % range. The observed decreases in the measured $O_2$ concentration reflected the decrease of the Argon swirl number when the charge is heated and on the drop of temperature of the incoming gas.

The operation of swirl blanketing which was extended for the whole foundry production shift resulted in a nearly complete reduction of slag generated and skimmed from molten metal, reduced consumption of alloying additions and deoxidizing (silicon based) fluxes, improved thermal efficiency of melting, better control of tap temperature after minimizing the need for manual skimming, reduced need for melt overheating, as well as shortened the time of induction melting. The coarser fume and vapor particulates evolving from the bath were trapped inside the cone; the mid-sized fraction was spun from the cone exit in the horizontal plane and captured by the ventilation duct work surrounding the cone. The smallest and hardly visible fraction of the finest fume particulates created a slowly rotating and raising column which extended from the core of the cone by a few inches above the cone to be dispersed and captured by the overhead ventilation system. The overall discharge of fumes and vapors into the plant was less than without the swirl blanketing system in place.

EXAMPLE 5

Figure 8:
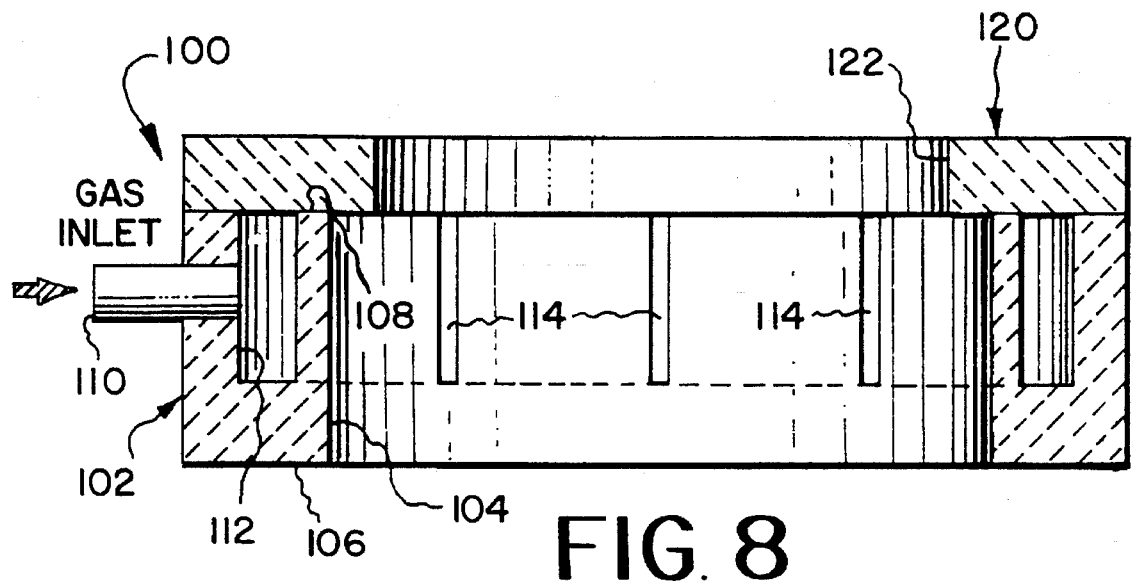
FIG. 8 is a schematic representation of an alternate embodiment of the device of FIG. 1b.

A ring 120 covered cylinder 102 swirl apparatus 100 was fabricated of a sandwiched refractory fiberboard material as shown in FIG. 8. Instead of round gas injection ports as in the Examples 1–4, the cylinder used six symmetrically located rectangular inlet slots 114. For the simplicity of fabrication, the slots intersected the internal wall 104 of the cylinder 102 in a nearly tangential mode, i.e. the gas was projected slightly into the cylinder rather than tangentially to the cylinder wall. An internal circular distributor passage 112 introduces gas from conduit 110 to the inlet slots or passages 114. The dimensions of the ring covered cylinder and the rectangular slots were as follows: $D_{ex}$=9.5" (120), $D_b$=12.0" (104), and $A_{sl}$=0.5"×2.0"=1 inch$^2$ where: $A_{sl}$= cross-sectional surface area of each slot 114. The swirl number of the cylinder was calculated from the relationship described in relation to Example 1, above.

$$S = (2/3)(T_{in}/T_{out})[D_b D_{ex}/(n\, D_{in}^2)] = (\pi/4)(2/3)(T_{in}/T_{out})[D_b D_{ex}/(n \pi D_{in}^2/4)] = (\pi/6)[D_b D_{ex}/(n\, A_{sl})] = (3.141\ldots/6)\,[12.0" \times 9.5"/(6 \times 1\text{ in}^2)] = 9.95$$

where:

$(n\, \pi D_{in}^2/4) = (n\, A_{sl})$, and $(T_{in}/T_{out}) = 1$

Room temperature blanketing tests were carried out using Argon gas at STP conditions using the same procedure as described in the previous examples. Oxygen concentration measurements were taken for four Argon flowrates through the cylinder apparatus 100 under two different ambient air conditions—still air and a strong horizontal air draft above the cylinder (at 5.4 feet/second). Ar(Argon)-exit velocity, $V_{ex}$, calculated from the relationship described in item 5, above, is listed along with the time averaged test results in Table 3.

TABLE 3

| Ar-Flowrate [SCFH] | $V_{exit}$ [feet/second] | Oxygen Conc. [vol %] for Still Air | Oxygen Conc. [vol %] for Air Draft (5.4 ft/sec) |
|---|---|---|---|
| 500 | 0.282 | 0.0 | 5.0–10.0 |

TABLE 3-continued

| Ar-Flowrate [SCFH] | $V_{exit}$ [feet/second] | Oxygen Conc. [vol %] for Still Air | Oxygen Conc. [vol %] for Air Draft (5.4 ft/sec) |
|---|---|---|---|
| 1000 | 0.564 | 0.0 | 2.0–4.0 |
| 1500 | 0.846 | 0.2 | 0.4–0.5 |
| 2000 | 1.128 | 0.5–0.9 | 0.6–0.9 |

The results show even a fairly flat and compact swirl cylinder can be effective in Ar-blanketing under a strong air draft provided that the swirl number (S) was lowered by enlarging the injector surface area ($n \cdot A_{sl}$), and the Ar exit velocity ($V_{ex}$) was increased by increasing the Ar flowrate. The described flat swirl cylinder is used on furnaces or ladles offering a limited headspace. Taller and simpler to make, swirl cones described in Examples 1 and 3 could be more cost-effective in other blanketing applications.

Figure 9:
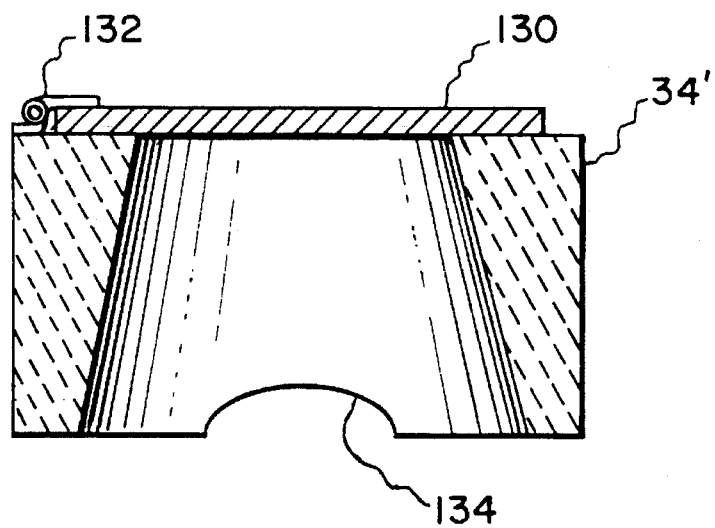
FIG. 9 is a cross-sectional view of the apparatus of the present invention illustrating an additional feature.

The apparatus of the present invention can be used to protect the metal as it is poured from the furnace 10 by a modification to the swirl cone shown as 34' in FIG. 9. A moveable cover 130 is placed on cone 34' via a hinge 132. During melting and pouring, the cover 130 can be placed as shown in FIG. 9 so that inert gas introduced into the cone is forced toward the surface of the molten metal and exits the furnace via notch 134 in cone 34' as the furnace is tilted for pouring thus protecting the molten metal until it reaches the mold. Cover 130 can be opened to charge the furnace and to permit gases and particles to escape cone 34' and be collected. During melting notch 34 can be sealed with a removeable blanket like refractory material.

In order the achieve the same low concentration of oxygen at the surface of molten metal, e.g. less than 1.0% $O_2$, the swirl blanketing system according to the present invention requires significantly less blanketing gas than the prior art blanketing systems. For example when compared to the gas curtain blanketing systems disclosed in U.S. Pat. No. 5,195,888, the consumption of blanketing gas per surface area of crucible opening in the argon swirl blanketing system according to the present invention is up to 240 times smaller (depending upon the flowrate selected for tangential injection of argon).

The blanketing system of the present invention can be operated using either gas at standard conditions, cool gas, or cryogenic liquid introduced into the swirl cone. The operation is controlled merely by mass-flowrate of argon or other blanketing medium that is denser than air. Both of these features permit the use of a significantly simplified supply and metering system and offer installation flexibility required by various types of foundries and other metallurgical or processing operations.

The process according to the present invention becomes even more effective with an increase in the temperature of the material being processed. Thermal expansion and the chimney effect of the swirl blanketing gas worked to exclude air from the bath surface, whereas the prior art gas curtain and cryogenic liquid blanketing systems operate according to different principles and cannot demonstrate improvement in the effectiveness or a decrease in the blanketing medium consumption with an increase in melt temperature.

According to the present invention, molten salts, molten polymers, oils, quench baths, or other melted charge material can be processed in a furnace vessel or ladle and protected with the method and apparatus of the present invention.

The present invention can be used to minimize back-diffusion of gases or vapors removed from the melt during a degassing operation to thus further enhance the degassing process. Apart from ferrous metallurgy, this feature is highly beneficial in degassing aluminum melts.

Having thus described our invention what is desired to be secured by Letters Patent of the United States is set forth in the appended claims.

What is claimed:

1. An apparatus for gas blanketing an open top vessel containing hot liquids, solids or mixtures of liquids and solids comprising in combination;

a generally cylindrical shaped body of a heat resisting material said body having a first end for placement directly on an open top of said vessel and a second or discharge end which is open and generally parallel to said first end;

a central passage in said body extending from said first end to said second end, said central passage having a larger cross-section at said first end than at said second end;

at least one internal passage in said body terminating in an outlet in said central passage, said outlet located proximate to said first end of said body and adapted to induce a swirling flow to a fluid introduced into said internal passage as it exits said outlet; and means to introduce fluid into said internal passage.

2. An apparatus according to claim 1 wherein said body is a temperature resistant ceramic material.

3. An apparatus according to claim 1 wherein said internal passage communicates with a plurality of outlets spaced equally around said central passage.

4. An apparatus according to claim 1 wherein said internal passage communicates with two outlets disposed opposite to each other in said central passage.

5. An apparatus according to claim 1 wherein said passage in said body has a cross-sectional shape of truncated cone.

6. An apparatus according to claim 1 wherein said body is formed from a first section having a generally cylindrical internal passage having a diameter at least as large as that of said open top of said vessel and a second section in the shape of a ring having a generally cylindrical shaped passage having a diameter smaller than that of said first section.

7. An apparatus according to claim 1 wherein said passage in said body has a cross-sectional shape of a stepped cylinder having a larger diameter portion extending from said first end of said body and a smaller diameter portion extending from said second end of said body.

8. An apparatus according to claim 1 including a moveable cover for use during pouring to direct fluid flow toward a liquid outlet in said vessel when said apparatus and said cover are installed on said vessel.

9. An apparatus according to claim 1 wherein said vessel is an induction heating furnace.

10. An apparatus according to claim 9 wherein a larger diameter portion of a stepped cylinder is formed as an extension of a crucible in said furnace and a smaller diameter portion is in the shape of a ring placed on said extension.

11. An apparatus according to claim 9 wherein said induction heating furnace has a pouring spout and said body includes a notch said notch adapted for placement adjacent said spout in said furnace.

12. An apparatus according to claim 1 wherein said vessel is a molten metal ladle.

13. A method of protecting the opening of an open top vessel to minimize ambient atmosphere contact of material contained in said vessel comprising the steps of:

establishing a swirling flow of an inert gas having a density greater than that of the ambient atmosphere proximate to said open top of said vessel, said swirl having an axis of rotation coincidental with a vertical axis of said vessel and an upwardly vertical velocity component, said swirling flow established by gas flow through an orifice in an inner wall of a generally cylindrical device having a first end placed on said open top of said vessel and a second discharge end, said first and second ends having openings, said first end opening having a greater cross-section than said second discharge end opening, said gas exiting said second discharge end opening at a mean average velocity of between 0.01 and 4.0 feet/second; and allowing said gas to exit said swirling path from said second discharge end opening a specified distance from said open top of said vessel.

14. A method according to claim 13 wherein said swirling gas has a gas swirl number controlled within the range of 1.0 to 1000.

15. A method according to claim 13 wherein said inert gas is argon.

16. A method according to claim 11 wherein said inert gas has a density at least 1.38 times that of ambient air.

17. A method according to claim 13 where said swirling flow of gas is established during melting of metal in a titling induction furnace.

18. A method according to claim 14 wherein said exit path of said gas is blocked as said furnace is tilted to pour molten metal into a mold.

* * * * *